Feb. 19, 1946.  A. O. WILLIAMS  2,395,207
SHAFT BRAKE
Filed Aug. 4, 1944   2 Sheets-Sheet 1

INVENTOR.
Alfred O. Williams
BY Walter E. Schirmer
ATTY.

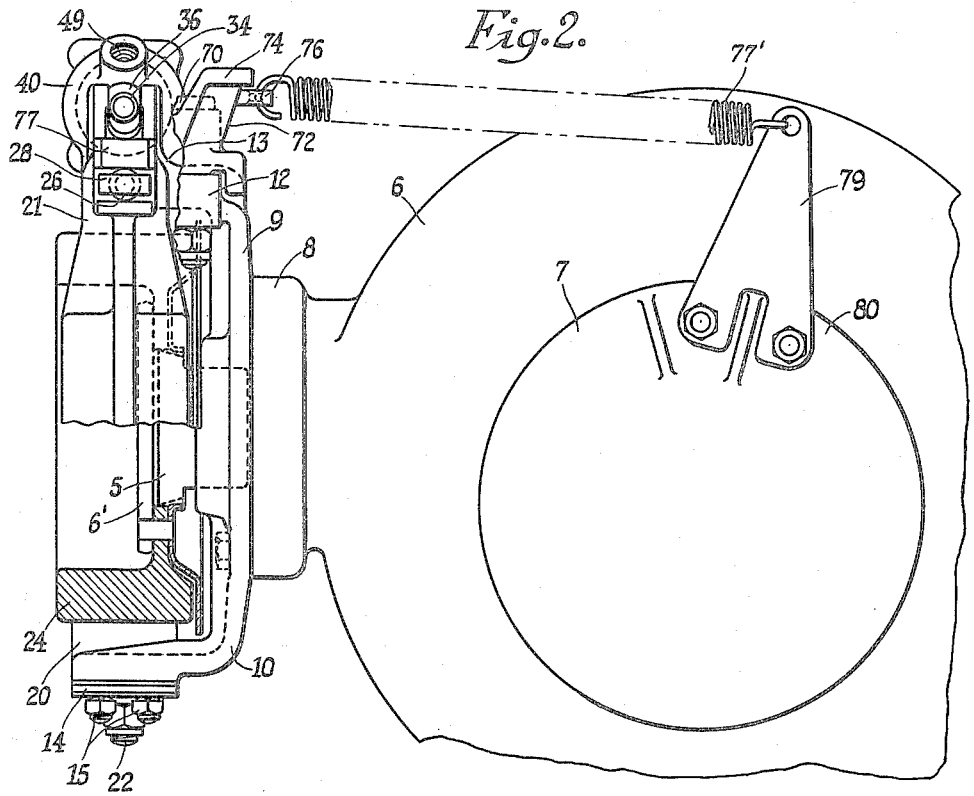
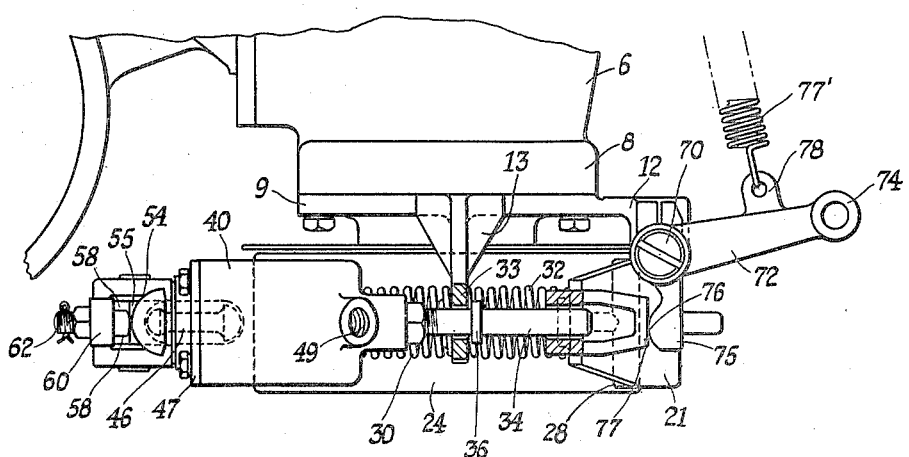

Patented Feb. 19, 1946

2,395,207

UNITED STATES PATENT OFFICE 2,395,207

SHAFT BRAKE

Alfred O. Williams, Battle Creek, Mich., assignor to Clark Equipment Company, Buchanan, Mich., a corporation of Michigan Application August 4, 1944, Serial No. 548,056

7 Claims. (Cl. 188—107)

This invention relates to shaft brakes, and more particularly is directed to a brake construction adapted for use on the propeller shaft extending between the motor and drive axle of a rail car truck such as is used in street cars, subway and rapid transit cars.

The present invention provides a construction somewhat similar to that disclosed in my copending application, Serial No. 532,331, filed April 22, 1944, but embodies certain changes and additions thereto, and revises the construction in other respects.

One of the primary objects of the present invention is to provide a brake construction for shafts of this type in which two brake shoes are provided for engagement with a brake drum carried by the shaft, the two shoes being resiliently anchored at adjacent ends and having the opposite ends arranged for conjoint movement through the medium of a single air cylinder carried on one of the shoes and a motion transmitting member actuated through the air cylinder and engaging the adjacent end of the opposite shoe.

In carrying out the present invention I provide an arcuate brake shoe resiliently anchored at one end and having the opposite end provided with an air cylinder and rocker arm, imposing a rocking force thereon which, through an intermediate tie bar, transmits an engaging force to the opposite brake shoe, the reaction within the cylinder operating to move the first shoe conjointly therewith into braking engagement.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 2 is a side elevational view, partly in section, of the construction shown in Figure 1; and Figure 3 is a partial top plan view of the brake construction.

Figure 1:
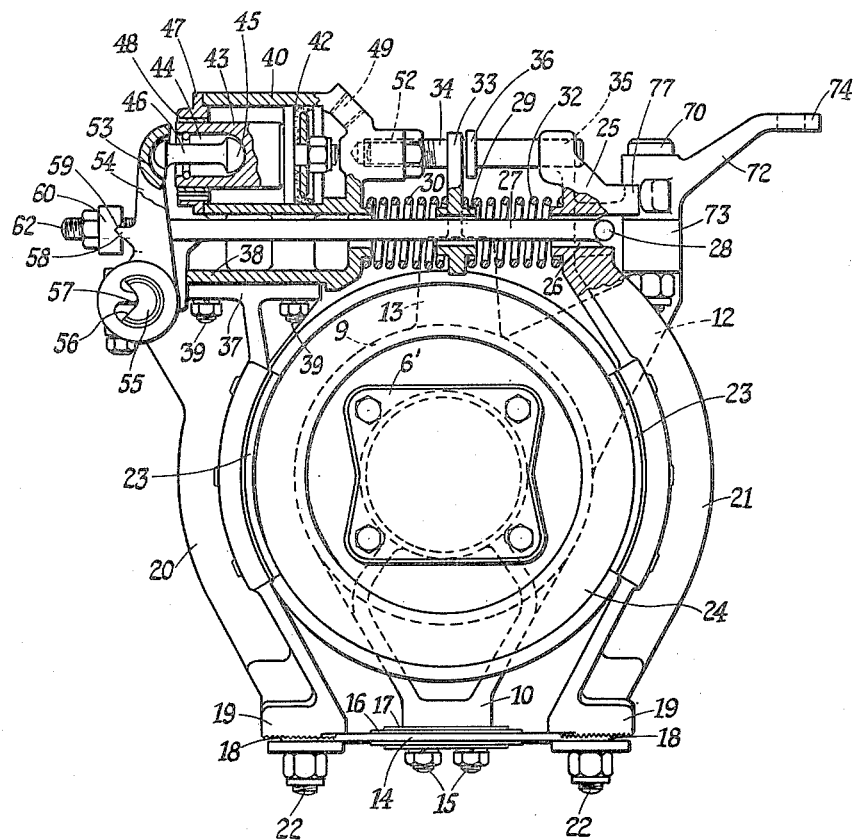
Figure 1 is an elevational view of a brake construction embodying the present invention.

Referring now in detail to the drawings, there is shown a shaft member 5 which has mounted thereon a companion flange 6' whereby the shaft is connected to a propeller shaft which in turn is connected to a driving motor (not shown). The shaft 5 is adapted to extend into a housing 6 and carries a pinion on the inner end thereof driving a ring gear in the housing 6. The housing 6 is provided with oppositely extending arm portions 7 through which the axle shaft extends to the wheels.

Bolted to the nose portion 8 of the housing 6 is a supporting plate or bracket 9 which, as shown in Figure 1, is provided with a depending arm portion 10 and offset angularly extending portion 12 and a vertically extending portion 13. The depending portion 10 of the bracket 9 provides an anchor for a normally extending plate member 14 which is bolted or otherwise rigidly secured thereto as indicated at 15. The member 14 is flexible, being preferably of resilient steel and has suitable leaf spring members 16 and 17 on opposite sides thereof for preventing build-up of bending stress. The opposite ends of the member 14 are serrated and slotted as indicated at 18 and are adapted to receive the correspondingly serrated bossed ends 19 of the brake shoes 20 and 21, respectively, these shoes being adjustably secured in the serrated slotted ends 18 by means of the studs 22. This provides an adjustable mounting for the shoes 20 and 21 which will provide for taking up of wear in the brake linings 23 carried on the inner face of the shoe and embracing the external annular surface of the brake drum 24.

The shoe 21 at its upper end is provided with a vertically extending portion 25 which has a cross opening 26 formed therein adapted to receive a motion transmitting rod 27 having a T-shaped head 28 which locks the bar against withdrawal from the shoe 21 in one direction. The intermediate portion 13 of the bracket member 9 is provided with a collar portion 29 through which the rod 27 is guided and which also forms a suitable seat for coil springs 30 and 32 which tend to urge the brake shoe out of engagement with the drum 24. The collar portion 29 terminates in a vertically extending flange 33 which is provided with a suitable opening through which the rod 34 extends, this rod being slidably received in a suitable opening 35 in the bracket end 25 of the shoe 21, and being provided with a stop collar 36 limiting movement of the rod in one direction.

The opposite brake shoe 20 is provided with a flange portion 37 upon which is mounted a body member 38 as by means of the studs 39, the body member including a cylinder portion 40 having disposed therein the piston 42 provided with a recessed outwardly extending rod portion 43 having the axially extending recess 44 terminating in a spherical seat portion within which the head end 45 of a strut member 46 is located. A suitable closure plate 47 closes the outer end of the cylinder 40 and is provided with a suitable bushing 48 embracing the annular surface of piston rod

43. A suitable port 49 is provided for the admission of fluid under pressure against the head end of the piston 42, tending to move the piston outwardly of the cylinder 40. It will be noted that the rod 34 is threaded and locked as indicated at 52 into a bossed portion on the body member 38 whereby the rod 34 moves with this body member and the collar 36 prevents the spring 30 from moving the shoe 20 beyond a predetermined distance.

The strut member 46 at its outer end has bearing engagement in the spherical seat portion 53 of the crank member 54 which crank member is pivoted about the pin member 55 carried on an offset boss on the shoe 20. The pin member 55 is provided with an angularly shaped recess 56 adapted to receive the tongue 57 formed on the pivot end of the crank member 54, the tongue 57 rocking in the angularly shaped recess 56 and limiting the rotation of the crank 54 through an arc determined by the angle of the recess 56. Thus, the piston 42 is limited in its movement by the stop surfaces on the recess 56.

Intermediate its ends the crank member 54 is provided with the fulcrum ears 58 engaging in suitable notches 59 formed in an adjusting nut 60 carried on the threaded end 62 of the rod 27.

With the construction thus far described it will be apparent that the springs 30 and 32 normally maintain the brake shoes out of braking engagement, the outward movement being limited by the rod 34 and stop collar 36 with respect to the shoe 20, and by the T-shaped rod 27, and its connection back into the piston 42 so far as the shoe 21 is concerned.

When the fluid under pressure is admitted through the port 49 into the interior of the cylinder 40 the piston 42 tends to move outwardly of the cylinder or to the left as viewed in Figure 1. This results in the strut 46 tending to rotate the crank 54 in a counterclockwise direction. The ears 58 thereupon apply tension to the rod 27. This produces a pull on the shoe 21 to the left as viewed in Figure 1, forcing this shoe against the surface of the drum 10. However, the reaction of the fluid pressure within the cylinder 40 produces an opposite force on the end wall of the cylinder, tending to move the shoe 20 to the right as viewed in Figure 1 and therefore the brake applying shoe is balanced between the two shoes 20 and 21, forcing both shoes uniformly against the surface of the brake drum 24. When the pressure is released from the cylinder 40 the springs 30 and 32 tend to force the shoes outwardly away from the drum 24, this force also being balanced proportionately between the two shoes due to the interconnection of the T-rod 27 to the linkage into the piston 42. Consequently, it will be seen that a uniform but powerful brake applying force is provided for both of the shoes from the one cylinder 40 due to the interconnection through the piston and the rod 27 to the opposite shoe.

However, it is desirable that in addition to providing for fluid pressure operation of the brakes there also be means to actuate the brakes manually such as when the power is cut off of the vehicle or for parking or emergency purposes. For this reason there is provided a manual brake operating mechanism consisting of the pivot pin 70 carried by the offset bracket portion 12 and having mounted thereon the crank arm 72. The pin 70 is suitably secured within a boss 73 formed on the bracket 12, and the crank arm 72 is provided at its outer end with an eye portion 74 to which may be connected a brake control cable leading up to the operator's cab for manual operation. The opposite arm 75 of the crank 72 has a cam surface 76 bearing against a boss portion 77 formed on the end of the shoe 21.

Considering Figure 3 in detail, upon rotation of the crank arm 72 in a clockwise direction the crank portion 75 will bear against the upper end of the shoe 21, forcing this shoe inwardly against the brake drum 24 against the pressure of spring 32. The rod 34 under these conditions will act as a guide to prevent any possible cocking or misalignment of the shoe 21 during this operation. It will be apparent that with this type of construction only a single shoe is operated manually, but under normal circumstances this is sufficient to hold the vehicle against movement. A suitable return spring 77' is secured at one end to the ear 78 on the crank arm 72 and at its opposite end is anchored to the plate member 79, bolted or otherwise secured to the side wall 80 of the housing 6. Upon release of the tension in the brake applying cable connection to the eye 74, the spring 32 will return the shoe to disengaged position, the crank arm being rotated out of the way by means of the return spring 77'.

It is therefore believed apparent that I have provided a simplified brake construction capable of uniform brake application from a single cylinder keyed on one of the brake shoes and arranged for operation manually if so desired.

I do not intend to be limited to the exact details herein shown and described, but only insofar as defined by the scope and spirit of the appended claims.

I claim:

1. A shaft brake of the class described comprising a rotatable brake drum, an anchor plate adjacent said drum, a pair of arcuate brake shoes resiliently supported at one end on said plate for rocking movement toward and away from said drum, cylinder means including a fluid operated piston at the free end of one of said brake shoes, a lever pivotally mounted on said shoes and engaged by said piston, means limiting pivotal movement of said lever under actuation of said piston, and a pull rod connected to the free end of one of the shoes and engaged by an intermediate portion of said lever whereby said shoes are moved conjointly into engagement with said drum.

2. The brake of claim 1 including pin means guided in said anchor plate and engaging in openings in the free ends of said shoes to prevent lateral displacement of said shoes out of the plane of said drum.

3. Actuating means for a pair of arcuate brake shoes mounted for movement toward and away from a rotatable brake drum, comprising a cylinder carried on the free end of one shoe, a piston therein adapted to be actuated by fluid pressure, a motion transmitting means including a pivotally mounted lever, a ball and socket connection between the free end of said lever and said piston, and a pull rod connected between said lever and the other shoe, and actuated by movement of said lever for drawing the other of said shoes toward said drum, said first shoe being moved toward said drum by the fluid pressure reaction in said cylinder, and means normally biasing both of said shoes away from said drum.

4. Actuating means for a pair of arcuate brake shoes mounted for movement toward and away from a rotatable brake drum, comprising a cylinder carried on the free end of one shoe, a piston therein adapted to be actuated by fluid pressure, motion transmitting means actuated by movement of said piston for drawing the other of said shoes toward said drum, said first shoe being moved toward said drum by the fluid pressure reaction in said cylinder, means in said motion transmitting means for limiting the range of movement thereof under the action of said piston.

5. In combination, a brake drum, a pair of arcuate brake shoes anchored at one end for movement toward and away from said drum, a pull rod between the free ends of said shoes, spring means about said rod urging said ends apart, a lever pivotally mounted on the free end of one of said shoes and engaging said rod intermediate its ends, a cylinder carried by said free end of said one shoe having its axis parallel to said rod and having a fluid actuated piston therein, and a motion transmitting link between said piston and the free end of said lever, whereby actuation of said piston by fluid pressure in said cylinder rocks said lever to tension said pull rod for pulling the free end of said other shoe into drum engagement, said first shoe being moved toward said drum by the fluid pressure reaction in said cylinder.

6. The combination of claim 5 wherein said link has universal support in both said piston and said end of said lever.

7. The combination of claim 5 including means limiting pivotal motion of said lever under actuation of said piston.

ALFRED O. WILLIAMS.